July 14, 1931. P. G. PALMGREN 1,814,734
PRESSURE DISTRIBUTING MEANS FOR BEARINGS
Filed Nov. 14, 1925 2 Sheets-Sheet 1
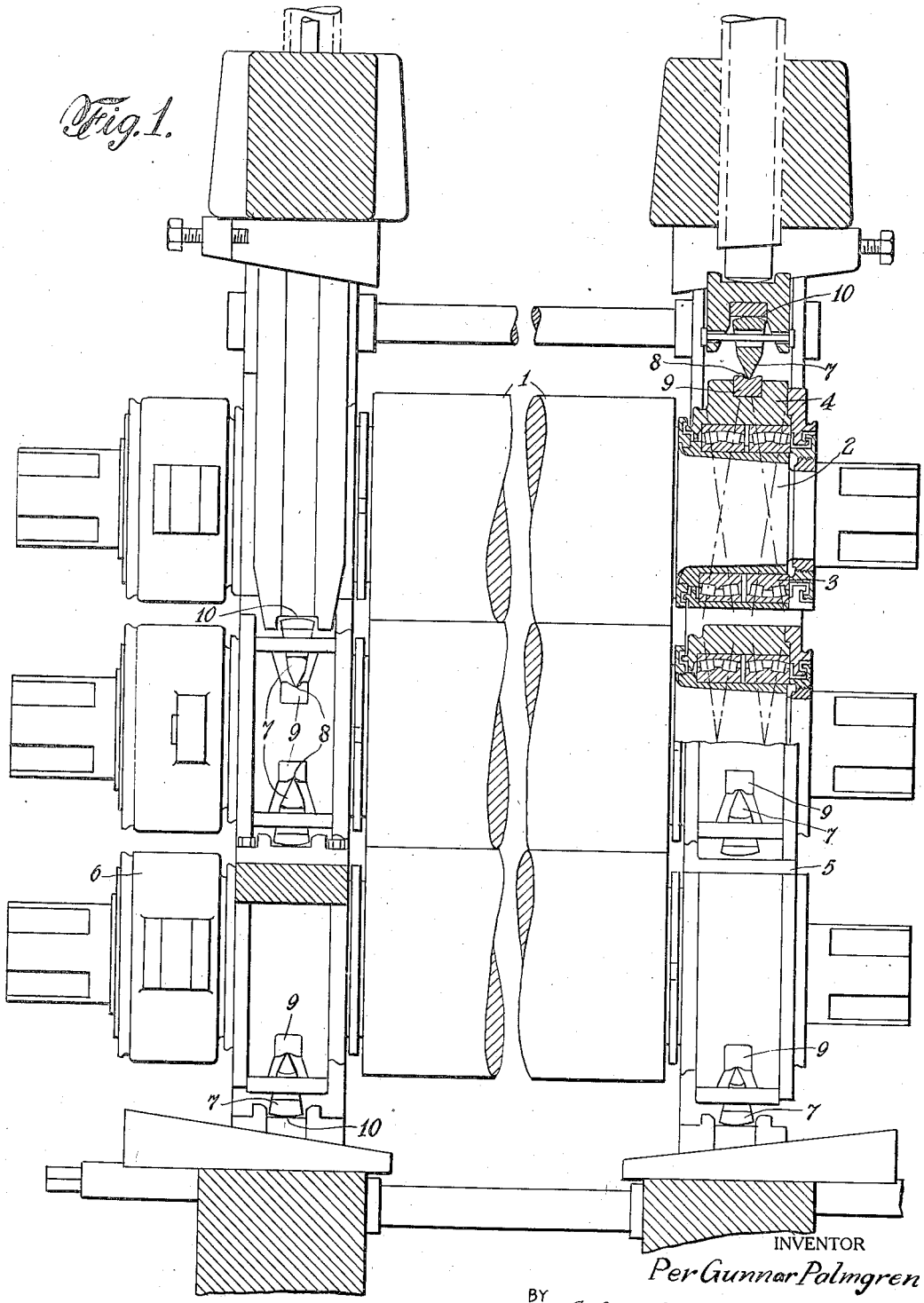

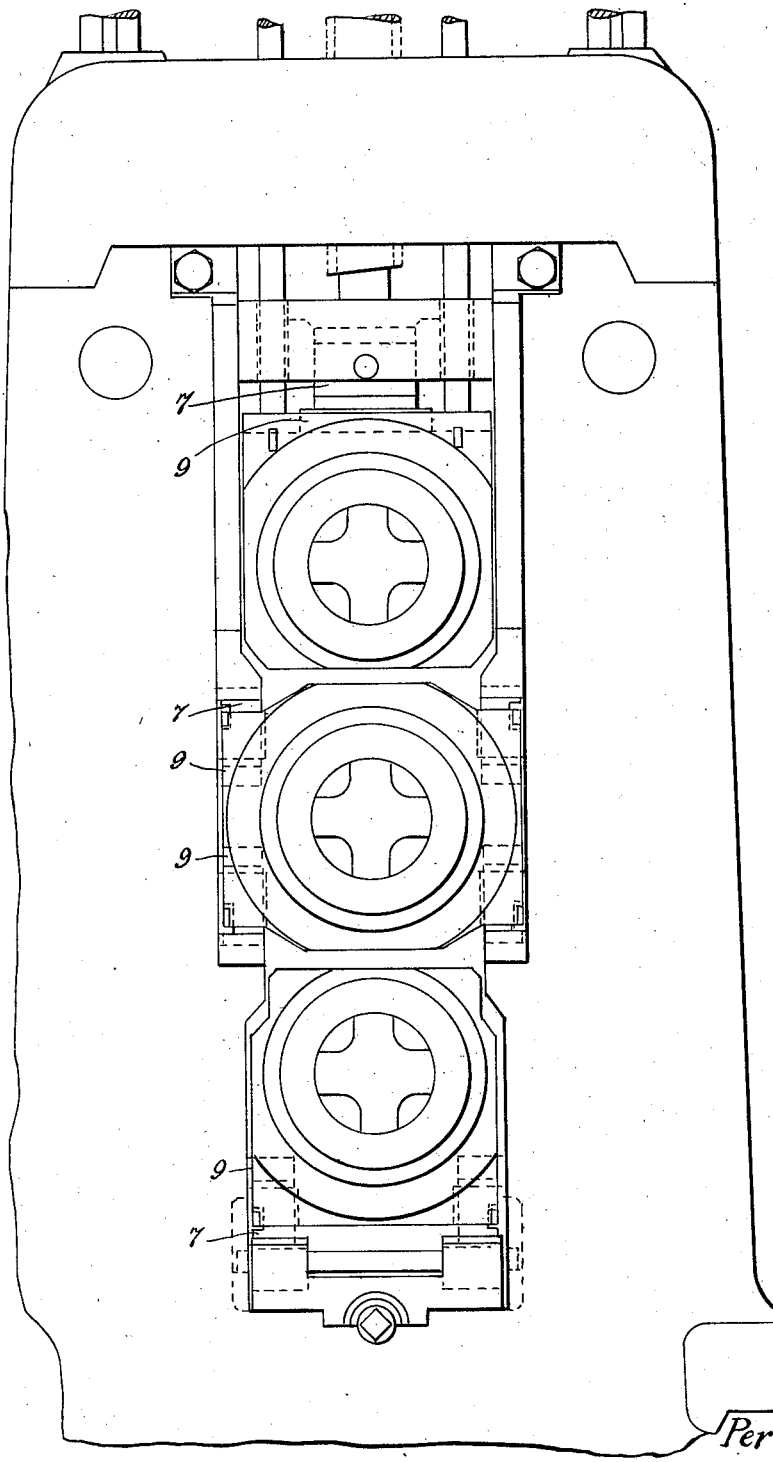

Patented July 14, 1931

1,814,734

UNITED STATES PATENT OFFICE

PER GUNNAR PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN

PRESSURE DISTRIBUTING MEANS FOR BEARINGS

Application filed November 14, 1925. Serial No. 68,961.

This invention relates to pressure distributing means for bearings, particularly for ball or roller bearings arranged by pairs in bearing housings. The invention consists, chiefly, in the housings being carried by or abutting against edges placed on sectors or the like having cylindrical bearing surfaces, the axis of which coincides or is parallel with the edges, these surfaces abutting against bearing surfaces in a frame, such as the stand of a rolling mill.

In the drawings, a three-high rolling mill having a pressure distributing device according to this invention is shown by way of example. Fig. 1 is a side view (partial longitudinal section) of the rolling mill. Fig. 2 is an end view thereof viewed from the right hand side of Fig. 1.

The rolls 1 are shown bearing with their necks 2 on "spherical" roller bearings 3 mounted in housings 4 in the stands 5. The particular type of bearing illustrated is furnished with an outer race formed or generated as a zone of a hollow sphere, preferably the equatorial zone. The rollers are curved from end to end and are preferably generated by rotating a curved line of approximately the radius of the outer race about the center of the roller. The roller bearings are arranged by pairs at each end of the rolls and arranged to take up radial pressure only. At the left hand side of Fig. 1, special thrust bearings 6 for taking up axial pressure are shown. For distributing the pressures on the radial bearings, sectors 7 are arranged, according to this invention, said sectors bearing with edges 8 on corresponding pans 9 at the outer side of the housings. The sectors are provided with cylindrical bearing surfaces 10 abutting against bearing surfaces in the stand.

The cylindrical axis of the bearing surface 10 of each sector is disposed transversely of the roll neck and coinciding or parallel with the edge 8. When one of the rolls is adjusted axially, its housings carry the edges of the sectors with them, causing their cylindrical bearing surfaces to roll on the bearing surfaces of the stand, the pressures passing through the edges being applied constantly against the housings at the same region so that the pressures remain uniformly and equally distributed on the bearings mounted in each of the housings.

I claim:

1. The combination with a frame, of a pair of bearing housings carried by the frame, a roll having necks at its ends, antifriction bearings mounted in the housings and on such necks and capable of shifting axially, and pressure distributing devices each having a cylindrical surface engaging a bearing surface on the frame and an edge engaging one of the bearing housings, the axis of the said cylindrical surface and such edge being disposed transversely of the axis of the roll.

2. The combination with a frame, of a rotary member, a bearing housing carried by the frame, a pair of spherical roller bearings mounted in the said frame for supporting the rotary member, and a pressure distributing device having a cylindrical surface engaging a bearing surface on the frame, and an edge parallel with the axis of the said cylindrical surface engaging the said housing constantly at the same region, such axis being disposed transversely of the axis of rotation of the said member.

3. The combination with a frame, a plurality of rolls provided at their ends with necks, a pair of spherical roller bearings mounted on each of such necks, the rolls being capable of shifting axially, a housing for each pair of bearings carried by the frame, of pressure distributing devices having cylindrical surfaces engaging the frame and an edge parallel with the axis of the said cylindrical surface engaging the housing constantly at the same region, such axis being disposed transversely of the axis of rotation of the said member.

4. The combination with a frame, of a bearing housing carried by the frame, a bearing having a part mounted for rotation in the housing, the housing being adapted to shift in the direction of the axis of rotation of the bearing part, and a pressure distributing device having a cylindrical surface engaging and adapted to roll upon a bearing surface on the frame and an edge parallel with the axis of the said cylindrical surface and disposed transversely of the said axis of rotation for engaging the housing constantly at the same region during such rolling.

In testimony whereof I have signed my name.

PER GUNNAR PALMGREN.